(12) United States Patent
McLaine

(10) Patent No.: US 9,850,156 B2
(45) Date of Patent: *Dec. 26, 2017

(54) SIDE-STREAM PARTICLE PRECIPITATOR APPARATUS AND SUSTEM FOR CONDENSER OPEN LOOP COOLING SYSTEM

(71) Applicant: Paul Q McLaine, Easton, PA (US)

(72) Inventor: Paul Q McLaine, Easton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/392,984

(22) Filed: Dec. 28, 2016

(65) Prior Publication Data

US 2017/0107138 A1    Apr. 20, 2017

Related U.S. Application Data

(63) Continuation-in-part of application No. 15/143,593, filed on May 1, 2016, now abandoned, which is a
(Continued)

(51) Int. Cl.
| | |
|---|---|
| C02F 1/48 | (2006.01) |
| C02F 1/467 | (2006.01) |
| B04C 5/081 | (2006.01) |
| C02F 9/00 | (2006.01) |
| C02F 1/20 | (2006.01) |

(Continued)

(52) U.S. Cl.
CPC ............ C02F 9/00 (2013.01); *C02F 1/20* (2013.01); *C02F 1/38* (2013.01); *C02F 1/4602* (2013.01); *C02F 1/463* (2013.01); *C02F 1/4608* (2013.01); *C02F 1/484* (2013.01);

*C02F 5/00* (2013.01); *C02F 2103/023* (2013.01); *C02F 2209/05* (2013.01); *C02F 2301/024* (2013.01);
(Continued)

(58) Field of Classification Search
CPC ...... C02F 1/4602; C02F 1/4606; C02F 1/463; C02F 1/484; C02F 1/766; C02F 2103/012; C02F 2201/46135; C02F 2209/05; C02F 2303/04; C02F 2303/08
See application file for complete search history.

(56) References Cited

U.S. PATENT DOCUMENTS

| | | |
|---|---|---|
| 2,662,855 A | 12/1953 | Kamlet |
| 3,612,087 A | 10/1971 | Roland |

(Continued)

OTHER PUBLICATIONS

Beer, Recreational Water Disinfection by Copper/Silver Ions, Feb. 15, 2014, pp. 4-5.

*Primary Examiner* — Dirk Bass
*Assistant Examiner* — Donovan C Bui-Huynh
(74) *Attorney, Agent, or Firm* — Sanford J. Piltch

(57) ABSTRACT

A side-stream particle precipitator system for the breakdown and removal of organic and inorganic suspended solids in water cooling systems using a plurality of ionizer treatment units utilizing electric and electro-magnetic fields and a mechanical vortex precipitating system with a static mixer for increasing retention time of the water complex in the precipitator to remove particulate materials contained in the water complex as suspended solids. The system also uses high voltage electrodes for charging the water complex to breakdown laminar flow at the conduit walls to mechanically dislodge any build-up of bio-materials or chemical compounds along the walls resulting in an increase in thermal conductivity.

8 Claims, 7 Drawing Sheets

Related U.S. Application Data continuation-in-part of application No. 14/256,977, filed on Apr. 20, 2014, now abandoned.

(51) Int. Cl.

| | | |
|---|---|---|
| *C02F 1/38* | (2006.01) | |
| *C02F 5/00* | (2006.01) | |
| *C02F 1/46* | (2006.01) | |
| *C02F 103/02* | (2006.01) | |
| *C02F 1/463* | (2006.01) | |

(52) U.S. Cl.
CPC ...... *C02F 2301/08* (2013.01); *C02F 2303/04* (2013.01); *C02F 2303/20* (2013.01)

(56) References Cited

U.S. PATENT DOCUMENTS

| | | |
|---|---|---|
| 4,073,712 A | 2/1978 | Means et al. |
| 4,212,724 A * | 7/1980 | Moeglich ............... A01K 63/04 204/268 |
| 5,200,106 A | 4/1993 | Hoots |
| 6,200,449 B1 * | 3/2001 | Lu ............... B01J 8/12 204/554 |
| 6,294,137 B1 | 9/2001 | McLaine |
| 6,482,327 B1 | 11/2002 | Mori et al. |
| 6,652,715 B2 | 11/2003 | McLaine |
| 8,460,520 B2 * | 6/2013 | Rigby ................... C02F 1/4602 204/228.1 |
| 2002/0170816 A1 | 11/2002 | Leffler |
| 2002/0185452 A1 | 12/2002 | Johnson |
| 2004/0254682 A1 * | 12/2004 | Kast ...................... C02F 3/1294 700/265 |
| 2007/0108056 A1 * | 5/2007 | Nyberg ................. B01D 61/44 204/554 |
| 2008/0156709 A1 | 7/2008 | Johnson |
| 2009/0211919 A1 | 8/2009 | Hegel |
| 2010/0243553 A1 * | 9/2010 | Vuilliomenet ....... B01D 17/045 210/435 |
| 2013/0105321 A1 | 5/2013 | Averbeck |
| 2015/0056128 A1 | 2/2015 | Saito |

\* cited by examiner

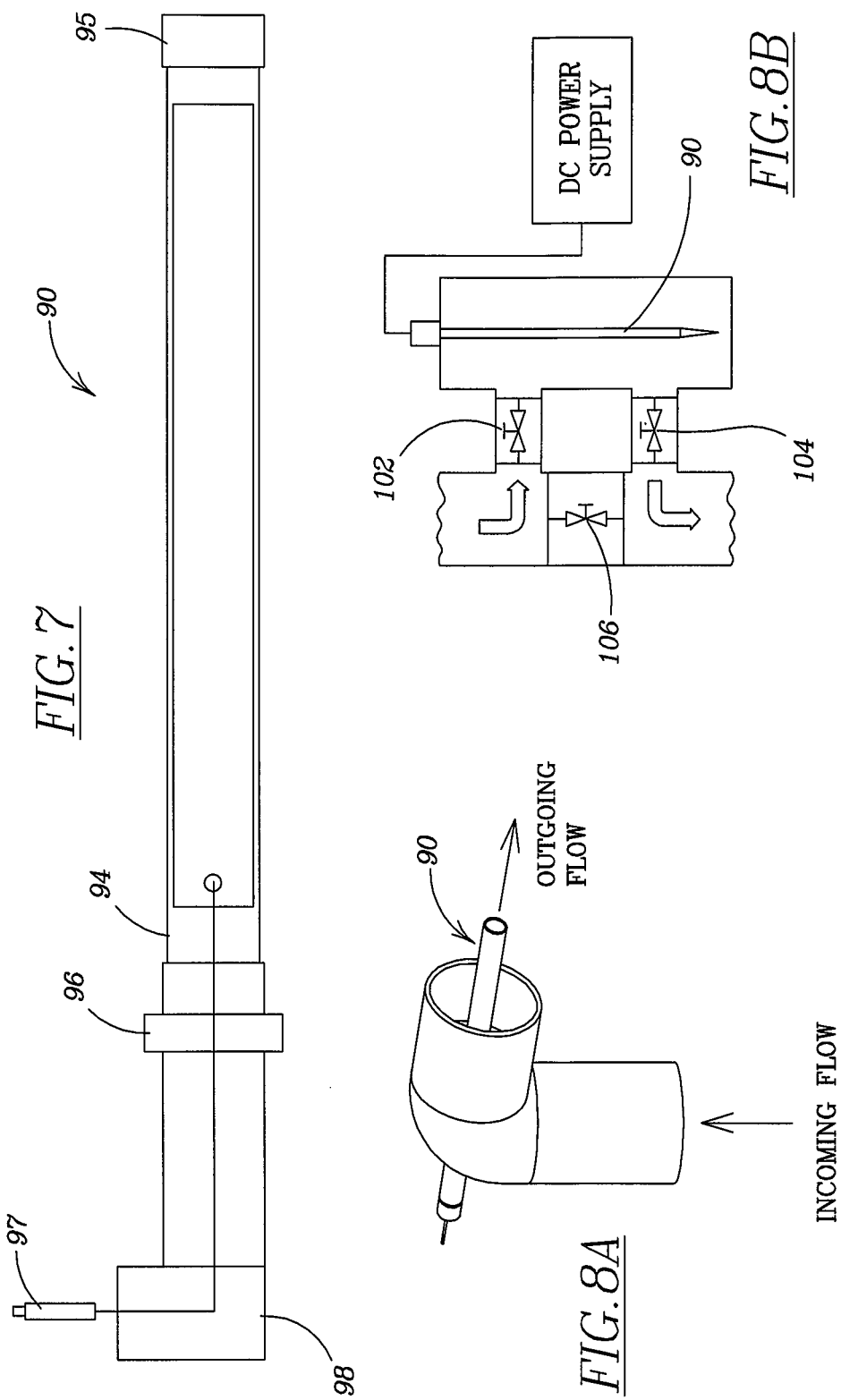

SIDE-STREAM PARTICLE PRECIPITATOR APPARATUS AND SUSTEM FOR CONDENSER OPEN LOOP COOLING SYSTEM

CROSS-REFERENCE TO RELATED APPLICATIONS

The instant application claims priority to, and incorporates expressly by reference, U.S. Non-Provisional patent application Ser. No. 15/143,593, filed on May 1, 2016, which application was published as U.S. Patent Application Publication No. US 2016/0257591 A1 on Sep. 8, 2016 and remains pending as of the date of filing of this application, and which prior application claimed priority from U.S. Non-Provisional patent application Ser. No. 14/256,997, filed on Apr. 20, 2014, which Application was published as U.S. Patent Application Publication No. US 2015/0299014 A1 on Oct. 22, 2015, and which prior application is now abandoned.

BACKGROUND OF THE INVENTION

The present invention relates to both electrostatic and electromagnetic treatment of fluid systems and more particularly to the construction and operation of water treating devices having electrostatic fields, electromagnetic fields, and micro-particle filtering to remove both particulate and biological materials from the water flowing within the system. The word "water", as used herein, means water complexes containing dissolved and suspended solids, biological materials, etc., as are normally found in a great many industrial and residential applications.

Industrial water cooling systems, including heat exchangers and water cooling towers, are examples of closed-loop and open loop recirculating systems that are susceptible to water complex contamination and fouling, as well as the buildup of scale or corrosion along the inner surfaces of the water conduits with the reduction of thermal transfer properties due to increased levels of particulate and biologic materials contained in the water stream and on the container surfaces. Closed recirculating systems use heat exchangers and circulate water in a closed loop with negligible evaporation to the atmosphere. Heat is transferred from a process system to the closed cooling water loop by heat exchange equipment and removed from the closed system loop by a second exchange of heat for cooling in an open recirculating system, commonly a water cooling tower open to the environment. Most chilled water systems will incorporate an open recirculating cooling water system with a cooling tower for condenser cooling.

Cooling water systems are subject to a variety of contaminants that can interfere with heat transfer, increase corrosion rates, restrict water flow, and cause loss of process efficiency and production. Customized scale inhibitor programs have been deemed necessary by existing industry recommendations for the prevention of mineral scales including calcium carbonate, calcium sulfate, calcium phosphate, magnesium silicate, and other silica compounds, and mixtures of these, and sludge and organic particulates including silt and windblown debris, biological deposits, metallic oxides, corrosion products, and other contaminants. Mineral scales form when dissolved solids and minerals are introduced to a cooling water system through a raw water source or as a result of airborne contamination. These dissolved solids precipitate when the solubility levels are exceeded due to increased concentrations, elevated water temperature, and higher pH levels. Sludge and organics form when suspended material (by-products of corrosion, dust, sand, microbial growth, and minerals) are introduced through influent water or airborne impurities.

These conditions have been historically treated with some form of chemical to either inhibit or disperse the water system contaminant. The function of a dispersant, or antifoulant, is to prevent the agglomeration of solids and their accumulation on critical surfaces. Materials that handle these potential deposits have been referred to in the industry as dispersants, polymers, penetrating agents, deposit control materials, polyectrolytes, crystal modifiers, antifoulants, sequestrants, mineral stabilizers, antiscalants, surfactants, mud removers, and emulsifiers, all of which are introduced into the fluid stream as some form of chemical additive.

Another problem that exists in cooling systems using a water complex as a coolant is the occurrence of corrosion along the fluid conduit internal surfaces. Such corrosion can be caused by dissolved oxygen in the water, precipitation of insoluble minerals, the breakdown of anti-freezing compositions, e.g., glycolic acids, and bacterial contamination. Corrosion inhibitors are designed to prevent metal loss along the fluid conduit and on metal containment surfaces that would otherwise lead to critical system failures in heat exchangers, recirculating water piping, and process cooling equipment. Moreover, corrosion will result in a loss of thermal efficiency as corrosion products precipitate on critical heat transfer devices and create an insulative deposit on the metal heat exchange surfaces.

Corrosion may be caused by metals attempting to return to their natural state. Corrosion can be present in many forms including uniform metal loss, localized or pitting, bi-metallic, galvanic, and microbiological induced corrosion. The process starts when surface irregularities, stresses, or compositional differences result in the formation of a corrosion cell (anode and cathode). Once started, corrosion at the anode causes metal to be released into the system or re-deposited locally. Pitting is particularly problematical because the local loss of metal can result in through-wall perforation of piping and tubing.

The industry has treated water cooling systems with a number of corrosion inhibiting chemicals that fall into three classes: organic, inorganic, and non-phosphate corrosion inhibitors. These products are engineered to passivate metals by reducing the corrosion potential associated with the anode and cathode of the corrosion cell. Chemicals that form protective films at the anode include chromate, orthophosphate, nitrite, silicate, and molybdate. Chemicals that form films on the cathode include calcium carbonate, polyphosphate, zinc, phosphonate, and a number of azoles.

The three most reliable corrosion inhibitors for closed cooling water systems are chromate, molybdate, and nitrite materials. Generally, the chromate or molybdate types have proven to be superior treatments. For mixed metallurgy systems, the molybdate inhibitors provide the best corrosion protection. Chromate treatments in the range of 500-1000 ppm as $Cr_4O^{2-}$ are satisfactory unless bimetallic influences exist. When such bimetallic couples as steel and copper are present, chromate treatment levels are recommended to be increased to exceed 2000 ppm. Maximum inhibitor effectiveness can be achieved if the pH of these systems is kept between 7.5 and 9.5.

In a closed system, it can be quite difficult to prevent corrosion of aluminum and its alloys; the pH of the water must be maintained below 9.0. Aluminum is amphoteric as it will dissolve in both acids and bases, and its corrosion rate accelerates at pH levels higher than 9.0. The bimetallic couple that is most difficult to cope with is that of copper and aluminum, for which chromate concentrations even higher than 5000 ppm may not be adequate. Also, where circulating pumps are equipped with certain mechanical seals, such as graphite, chromate concentrations may not exceed 250 ppm. This is due to the fact that water leaking past the seals evaporates and leaves a high concentration of abrasive salts that can damage the seal. Another problem is encountered when chromate inhibitors are used in cooling systems serving compressors that handle sour gas. If sour gas leaks from the power cylinder into the water circuit, significant chromate reduction will occur, causing poor corrosion control and deposition of reduced chromate. In view of the stated problems, treatment of the water with corrosion inhibitors in the form of chemicals compositions is not a complete resolution of the problem.

In very high heat transfer rate applications, such as continuous caster mold cooling systems, chromate levels should be maintained at 100-150 ppm maximum. Under these extreme conditions, chromate can accumulate at the grain boundaries on the mold, causing enough insulation to create equipment reliability problems. The toxicity of high-chromate concentrations may restrict their use, particularly when a system must be drained frequently. Current legislation has significantly reduced the allowable discharge limits and the reportable quantity for the spill of chromate-based products. Depending on the type of closed system and the various factors of State/Federal laws limiting the use of chromate, a non-chromate alternative may be needed.

Molybdate treatments provide effective corrosion protection and an environmentally acceptable alternative to chromate inhibitors. Nitrite-molybdate-azole blends inhibit corrosion in steel, copper, aluminum, and mixed-metallurgy systems. Molybdates are thermally stable and can provide excellent corrosion protection in both soft and hard water. System pH is normally controlled between 7.0 and 9.0. Industry recommended treatment control limits are 200-300 ppm molybdate as $MoO_4^{2-}$. However, Molybdate inhibitors are not recommended to be used with calcium levels greater than 500 ppm.

Nitrite is another widely accepted non-chromate closed cooling water inhibitor. Nitrite concentrations in the range of 600-1200 ppm as $NO_2^-$ will suitably inhibit iron and steel corrosion when the pH is maintained above 7.0. Systems containing steel and copper couples require treatment levels in the 5000-7000 ppm range. If aluminum is also present, the corrosion problem is intensified, and a treatment level of 10,000 ppm may be required. In all cases, the pH of the circulating water should be maintained in the alkaline range, but below 9.0 when aluminum is present. When high nitrite levels are applied, an acid feed may be required for pH control. One significant drawback to nitrite treatments is the fact that nitrites are oxidized by microorganisms. Denitrifying bacteria can consume the chemical inhibitor, reducing the protection on the fluid system's conduit and containment surfaces, which can lead to low inhibitor levels and biological fouling. Slime producing bacteria can accelerate such fouling. The feed of non-oxidizing antimicrobials may be necessary to control nitrite reversion and biological fouling. In addition, sulfate reducing bacteria and iron reducing bacteria produce acids that can cause thinning and ultimately holes through the inner surfaces of the walls of pipes, tubes and coils. In view of all of the above, it is clear that the use of one chemical can create a myriad of problems requiring other chemicals to correct. Further, with the strict limitations of chemical concentrations due to the use of certain metals in the conduit and containment systems, chemical usage is significantly inhibited.

As part of the closed loop system, heat exchangers are utilized to remove unwanted heat from an industrial process and typically transfer the thermal energy to a recirculating cooling water stream. The temperature of cooling water will be elevated as it absorbs heat from the process side, which is then expelled through partial evaporation of the water across a cooling tower. Several problems may arise in this heat transfer process as issues like corrosion, scale, fouling, and microbial growth will reduce flow rates and heat transfer rates and lower system efficiency. Heat exchangers are generally of three different designs including: shell and tube, plate and frame, and exposed tube. Chemical treatments to alleviate and remove the associated problems noted above have long been used in the industry with mixed results.

Open recirculating systems provide the most common form of industrial cooling, continually recycling and reusing the same water to cool process equipment. In these systems, water, after leaving the cooling tower, is pumped to industrial applications using heat exchangers, condensers, air compressor jackets, or process reactors. In this cycle, the water returning to the cooling tower water has absorbed excess heat from the manufacturing process which is then dissipated by spraying the water through a water cooling tower where partial evaporation takes place. The cooling tower exposes the heated water to air, causing a small percentage of the water to evaporate, which removes a substantial amount of heat in the process. The water that doesn't evaporate is cooled and then reused.

Reusing chemically treated cooling water results in not only water savings, but chemical savings as well, as the chemistries are retained in the system. However, problems associated with corrosion, deposition, and microbial growths become more severe for several reasons. First, the process of evaporation concentrates the amount of dissolved and suspended solids in the circulating water, leading to corrosion of conduit and containment surfaces and deposition of materials within the conduit flow stream. Secondly, the warm temperatures in open recirculating cooling towers results in significant biological growth. Lastly, the operation of a water cooling tower exposes the water to air and as a result airborne contaminants are absorbed that may be the cause of additional corrosion and microbial growth.

For many years the industry has treated these problems with a variety of chemical treatments as discussed above. Even though cooling towers have a number of designs including natural draft, mechanical, cross flow, and counter-flow the industry has responded to each of the designs with not less, but more chemical treatments. The chemical treatments are used to increase heat transfer efficiency by eliminating fouling within heat transfer piping with scale inhibitors by chemically preventing fouling that results from the precipitation of constituents, the settling of suspended matter, and microbial growth. Although, the corrosion inhibitor chemical treatments may reduce maintenance and plant downtime by keeping metals within the system from losing thickness, which cause system failures and reduce deposition caused by corrosion, they require continual monitoring and reintroduction as the chemistries are subject to reaction with the water and containment surfaces and to microbial oxidation. This will result in increased temperature differential in the cooling tower water due to the introduction of biocides to reduce the number and growth of microorganisms on cooling tower fill seeking to increase the splash effect for maximizing the air contact with the water and increase evaporation rates.

Another type of coolant water treatment is a non-chemical treatment of water complex systems. The non-chemical treatment has been the use of electric current within and without the conduits carrying the fluid flow. Apparatus for the treatment of moving liquid by causing electric current flow or discharge therein and/or impressing electrically induced fields there across have been known for many years, but the application of such devices to common industrial and residential problems, such as water system scaling and clogging, has only been met with varying success. Some installations have appeared to be functional while others which seemed to be operating under generally similar circumstances obviously failed and no broadly accepted reasons for the different results have been advanced. The optimum type, size and characteristics of a treatment system to produce desired and reliable results in a particular environment appear to have been unnecessarily limited with respect to DC voltage imposed on the electrostatic field.

One predictive method for water treatment was disclosed in U.S. Pat. No. 4,073,712 in which a positively charged, axially placed conduit electrode insulated by a dielectric material provides an electrostatic field through the flowing water in the conduit, with a negatively charged electrode around the conduit, thereby providing a three capacitor system. This early system was further advanced with the devices and methods of U.S. Pat. Nos. 6,294,137 and 6,652,715 that increased the voltage of the electrostatic field to at least 10,000 volts dc and up to in excess of 40,000 volts dc with an extremely low power of approximately 5 watts. Based upon the experiences of the reversed polarity of the electrodes and the increased voltage range, differing lengths of the electrode within the conduit are selected in the range of 18 to 36 inches with the particular length dependent upon flow rates, particulate concentration in and polarity of the liquid, the degree of required particulate non-aggregation or surface adhesion, and other related variables.

As can be seen from the foregoing discussion, a large number of factors and complex interactions are involved in the treating process to remove both particulate and biologic material from the liquid cooling stream. This seems logical since such liquid systems are themselves usually highly complex, including variations in dissolved salts, suspended solids, turbulence, pH, piping, electrical environment, temperature, pressure, biologic elements, etc. Many liquid clogging mechanisms, including water system scaling, involve the electrostatic relations between suspended particles, the carrier liquid and the walls of the piping network.

Thus, an electrostatic field effectively developed across a section of flowing water primarily affects not only the water, but mainly suspended, especially colloidal size, particles immersed in the water. The effect of the field will depend, in large measure, upon the relationship of the natural electrostatic charge on such immersed particles to the electrostatic charge on the various surfaces of the treating apparatus and how the latter charge induces a response on the liquid contacting surfaces of the piping network. If relative conditions are proper, the particles will be urged by the field to remain in suspension or migrate toward a charged electrode isolated from the walls of the piping network, thus reducing the tendency to form flow restricting deposits on the inner surface of the conduit. The reduction of colloid particles which are capable of acting as seeds for nucleation of scale building crystal formations results in a reduced tendency for scale deposition.

The natural electrostatic charge on the immersed particles in the liquid, or more accurately, the overall charge effect of the various groups of particles normally associated in the same system, can be determined by known procedures, but the control of the electrostatic charge in critical treater surfaces has been heretofore very limited due to the configuration of the electrodes. One aspect of the present invention continues the reversal of the decades old method of fabricating conduit electrostatic field treatment devices. This is accomplished by locating the positive, ground electrode situated generally within the axial space of the conduit at or near a right angle inlet/outlet flow point, where the conduit inner surface serves as the negatively charged electrode such that the liquid flowing in the conduit becomes negatively charged for later process advantage. The precise placement of the in-flow electrode will be described with greater particularity below.

The electrostatic field between particular water treater surfaces, in large part, can be predicted and controlled by limiting certain parameters in treater construction and installation including the dielectric constant of the insulating material or materials in contact with the water, the efficiency of the insulating material or materials and seals in preventing charge leakage, and the physical size ratio of the treater parts which form the surfaces producing the electrostatic field across the water complex under treatment.

However, the in-flow electrode water treater is only one of several sub-systems to accomplish the multi-phase treatment of the water system by the present invention. With the addition of a series of in-flow electrodes along with the altering of the configuration of the electrode from a single pole to a dual pole immersed in the liquid flow enhances the electrostatic treatment effect. Also, altering the type of metal used in the electrodes selected for the elimination of biologic materials such as bacteria and minute plant life further enhances the electrostatic treatment effect. Two of these modified electrodes coupled with a magnetic/ion charging electrode placed within a series of bio-cells have been determined to substantially, if not completely, eliminate biologic materials from recirculating through the liquid flow system.

The dissolved and suspended particulate materials, as well as the biologic materials, are also passed through a series of filtering vessels that cause the separation of the dissolved and suspended solids from the liquid flow for particles approximating one micron in size or larger. Each of the filtering vessels creates a flow path that will create turbulence in the water such that the particulate material will precipitate downward due to gravity when blocked by screening materials. The number of filtering vessels that are required is dependent upon the application, i.e., the quantity of coolant water flowing past a fixed point and the flow rate of the water, with the number usually falling in the range of from two to six filter vessels being utilized.

The principal objects of the present invention are: to provide operable and efficient multi-phase water treatment systems including the use of electrostatic water treaters and mechanical filtering; to provide such treaters which function to predictably inhibit the formation of scale from colloidal particles immersed in flowing water; to provide a treater construction which substantially reduces the formation of scale in piping systems and may function to remove scale already formed; and to provide a treater construction which substantially reduces biologic materials such as bacteria and minute plant life, e.g., algae, slime, etc. contained in the flowing water. It is another object of the present invention to cause the precipitation of suspended particles out of the water complex and to manage any dissolved solids contained therein by reducing the particulate materials contained within the water complex, precipitate such particulate materials for collection, and remove them entirely from contact with the continuing flow of the water complex.

It is also an object of the present invention to provide a method of designing operable and efficient multi-phase water treatment systems for particular installations and to provide a method of treating water to reliably inhibit the formation of certain clogging deposits in the piping system containing the same. It is a further object of the present invention to provide a dependable alternative to many types of chemical water treatment for water systems and to provide such methods and apparatus which have wide application in improving desired properties of water systems for industrial and residential purposes at minimal cost and maximum safety.

Other objects will appear hereinafter.

SUMMARY OF THE INVENTION

A water treatment system for the removal of biologic and particulate materials suspended or retained in a water complex used in a water cooling system is described that is comprised of a pump for circulating the water complex through the water treatment system, a conductivity meter located at the water inlet to the pump for providing a sensor measurement of the electrical conductivity of the water complex, a plurality of at least two ionizer cells of two differing types—a series of mechanical precipitators, a high voltage low wattage electrode situated in close proximity to the mechanical precipitators and a program logic controller to control the timing of the water treatment system components. The ionizers each contain a unique electrode for use in the substantial elimination of biologic materials in the form of aerobic and anaerobic organisms that are in solution in the water complex, control the regrowth of surface growing algae and slime, and impart a surface charge to any clump, coagulate or colloidal particulate or solid material. The resulting surface charge on the particulate or solid material results in particles in the range of 1-5 microns attracting one another so that such particles combine together resulting in particles of larger size. The series of mechanical precipitators through a tortuous pathway increase the relative time that the water complex remains within the precipitator, i.e., retention time, such that the particles of larger size can precipitate out of the water complex for later disposal. The high voltage low wattage electrode is situated in close proximity to the mechanical filters to negatively charge the water complex. The negative charging creates a breakdown in the laminar boundary along the inner surfaces of the conduits along one or more conduits in the water cooling system in contact with the water complex such that the continuing flow will dislodge and remove scale, slime, and some corrosion from the conduit surfaces. The program logic controller controls the timing of the water treatment system by turning on and off the circulating pump, the ionizer electrodes, the high voltage electrode, and controlling the voltages applied to the several electrodes of the various elements of the water treatment system. The program logic controller also controls the associated valving for each component for controlling the flow of the water complex through the ionizers and the mechanical precipitators based upon the conductivity measurement of the water complex inflow provided by the conductivity meter. In this manner the water complex is cleansed of biologic and particulate matter, either in suspension of residing on conduit or vessel surfaces, increasing the thermal conductivity of the water complex and reducing overall water usage without need for chemical additives.

In order to more efficiently accomplish its function, the first ionizer is comprised of a containment vessel that houses a first dual-spaced apart electrode structure extending into the flow path of the water complex within the vessel with each of the dual electrodes being of titanium such that, when such dual electrodes are energized under the regulation of the programmable logic controller with either the same or reverse polarity dc voltage, the dual electrodes drive free $H_2$ and $O_2$ from the water complex depriving the water complex of those chemicals resulting in the substantial elimination of most aerobic and anaerobic organisms that are in solution in the water complex for the lack of said chemicals. In order to maintain minimal amounts of aerobic and anaerobic organisms, the first ionizer is maintained in a continually charged state.

The second ionizer has a single electrode structure with said electrode made of a series of high-intensity electromagnets positioned with spacing and opposing polarity positioning maintained along the entire length of the electrode by non-conducting spacers and positioners within a non-conducting elongate tube. The electro-magnets impart a surface charge to any clump, coagulate or colloidal particulate matter making particles in the range of 1-5 microns attract other particles of similar, smaller or larger size to combine together making particles of still larger sizes. The second ionizer is continually charged to create particles of sizes that can be mechanically precipitated out of the water complex.

One or more additional ionizers positioned between the first and second ionizers and each housing a dual electrode structure extending into the flow path of the water complex with each electrode made of titanium. As above, when energized under the regulation of the programmable logic controller with either the same or reverse polarity dc voltage, the electrodes will drive free $H_2$ and $O_2$ from the water complex depriving the water complex of those chemicals that will substantially eliminate most aerobic and anaerobic organisms that are in solution in the water complex for the lack of said chemicals.

A third type of ionizer may be positioned between the first and second ionizers also houses a dual electrode structure extending into the flow path of the water complex with each electrode made of a copper/silver alloy, where copper makes up 99% and silver makes up 1% of the alloy material. The copper/silver alloy material is utilized to substantially eliminate and control the regrowth of surface growing algae and slime by the erosion of the copper component of the copper/silver alloy. When the electrodes are energized under the regulation of the programmable logic controller, the copper component of the copper/silver alloy erodes and is discharged into the water complex at a concentration rate of 0.1-0.3 ppm remaining in solution in said water complex for a time period of approximately one hour, during said time period and thereafter the eroded copper will bond with calcium in the water complex becoming a particulate solid that will precipitate out of solution to be removed from the water complex by mechanical filtering of the particulate solid. However, this electrode is not required to be charged continually. The electrode of the third type of ionizer is energized 3-4 times daily, where such duty cycle usually occurs once every four hours during daylight hours.

The mechanical precipitator is comprised of a plurality of such mechanical precipitators, i.e., static mixers to create a water complex retention period, connected in series to cause the precipitation of particles of larger size out of the water complex for disposal. Each of the plurality of static mixers comprises a containment vessel having an inlet permitting the water complex to flow into and downward through an outer cylindrical chamber surrounding a central cylindrical chamber and into a central cylindrical chamber creating a vortex having an upward flow toward a static mixer. The static mixer blocks the free passage of the water complex by interposing a plurality of screens located at the entrance and exit to the static mixer that, along with a stainless steel mesh housed within the static mixer, allows only the water complex to flow through creating a retention time within the static mixer before the flow can exit through the outlet. Suspended particulate materials are temporarily retained within and below the static mixer in the central cylindrical chamber. The static mixer returns the particulate materials to the vortex and to the sides of the central chamber such that the particles will precipitate by gravity down the central cylindrical chamber walls to the bottom of the filter and through a plurality of holes to be collected in a trap for later disposal.

The water treatment system also includes a high voltage electrode that is centrally axially positioned within a conduit of the water treatment system in close proximity to the mechanical precipitators for negatively charging the water complex. The negative charging of the water complex results in a breakdown in the laminar boundary at the inner surfaces of the conduits in contact with the with the water complex which, in turn, removes scale, slime, and corrosion from the conduit surfaces. The removal of scale, slime and corrosion along the conduit and vessel walls increases the effective cooling and expected thermal exchange of the water cooling system.

The water treatment system may include a bromine feeder that injects a chemical oxidizer into the water complex to substantially eliminate all organic materials. The bromine feeder is isolated by a pair of valves that are opened when the chemical oxidizer is utilized in addition or as a substitution to the several ionizers, particularly the third type ionizer.

The water treatment system may also include a solid chemical corrosion inhibitor utilizing a non-toxic organic corrosion inhibitor that is dispensed from a solid chemical feeder and added to the water complex. The solid chemical corrosion inhibitor is isolated by a chemical pump that is operated when the solid chemical additive becomes required to reduce corrosion levels in the conduits and containment vessels of the cooling system when make-up water is added to the water cooling system.

The water treatment system also includes a backflush function which will occur under the regulation of the programmable logic controller, upon the sensing by the conductivity meter of an increased electrical conductivity in the water complex, by altering the direction of flow of the water complex through a diverting valve and entering through an upper portion of the mechanical precipitators by reversing the normal flow permitting the particulate material precipitated out of the water complex and collected in the trap to be flushed away through a drain valve. The water complex conductivity measurement is programmatically timed through the program controller, but may also be manually triggered as needed.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 7 is a plan view of the high voltage electrode placed in any one of the condenser feed lines.

FIG. 8A is a perspective cutaway view of the high voltage electrode of FIG. 7 placed at the inlet elbow of a condenser feed line.

FIG. 8B is a plan view of the high voltage electrode of FIG. 7 placed in a parallel side stream reaction vessel alongside a water column to be treated.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
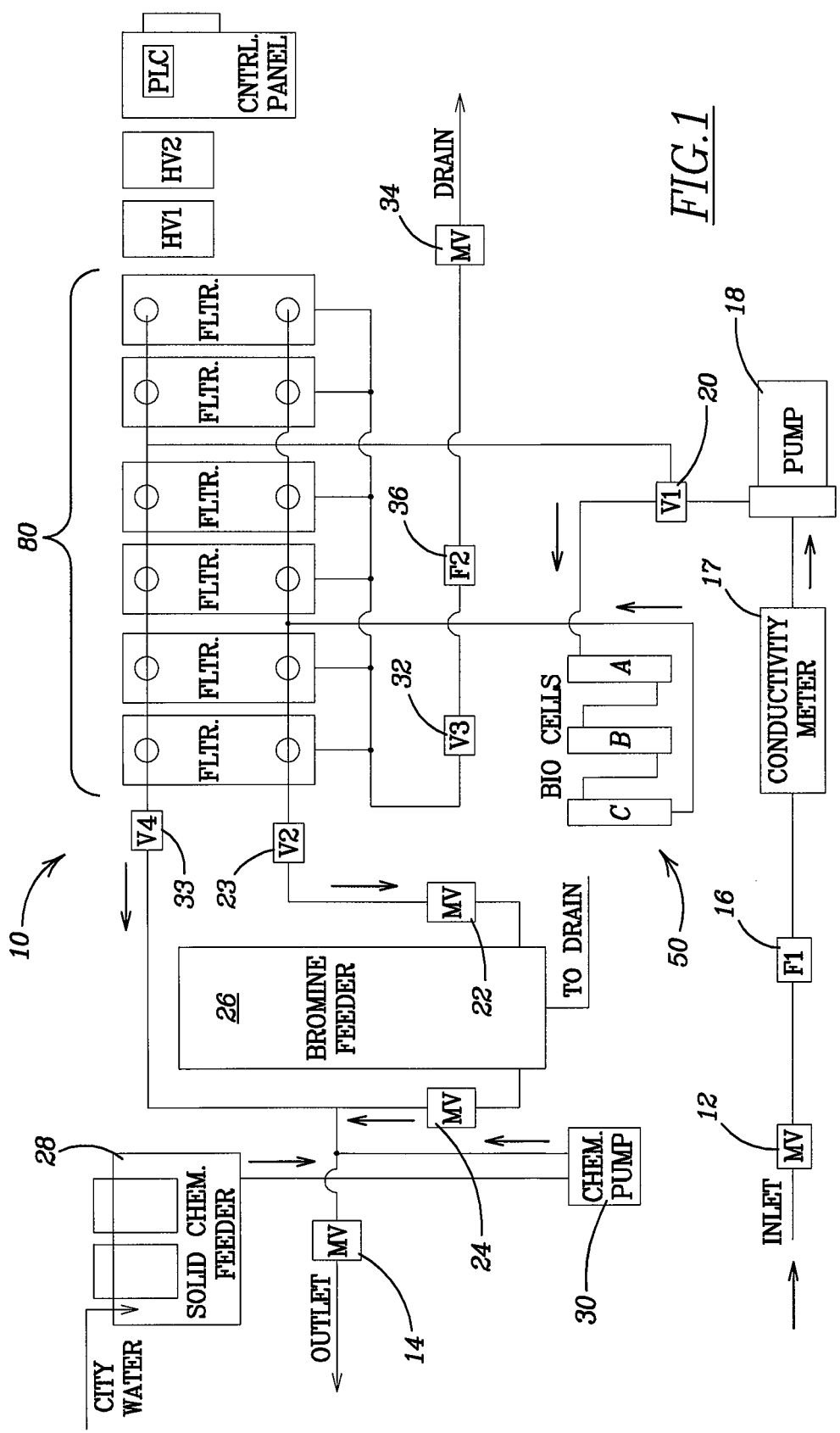
FIG. 1 is a schematic diagram of the various elements and interconnections of the non-chemical water treatment apparatus of the present invention.

Referring now to the drawings in detail, where like numerals refer to like parts or elements, there is shown in FIG. 1 the water treatment system 10 of the present invention. The water treatment system 10 is connected into a water complex heat transfer system by master inlet valve 12 and master outlet valve 14. In order to record the amount of water passing through the water treatment system 10, an inlet flow meter 16 is placed in the inlet water line. The incoming water complex is also measured for conductivity by a conductivity meter 17 that may be a part of the water treatment system 10 or obtained from an existing conductivity meter already a part of the water complex heat transfer system.

Conductivity is used to measure the concentration of dissolved solids in the incoming water complex, which dissolved solids have been ionized in the water complex by travelling through the side-stream particle precipitator apparatus 10 at least once. Specific Conductance (SC) is a measure of how well water can conduct an electrical current. Conductivity will increase with an increasing number and mobility of ions present in the water solution. These ions, which come from the breakdown of compounds, conduct electricity because they are negatively or positively charged when dissolved in water.

The electrical conductivity meter (EC meter) 17 measures the electrical conductivity of the water complex in solution. EC meters are commonly used in hydroponics, aquaculture and freshwater systems to monitor the amount of nutrients, salts or impurities in the water. Industrial conductivity probes often employ an inductive method of measurement, which has the advantage that the fluid does not wet the electrical parts of the sensor. Two inductively-coupled coils are used. One is the driving coil producing a magnetic field and it is supplied with an accurately-known voltage. The other inductor forms a secondary coil of a transformer. The liquid passing through a channel in the sensor forms one turn in the secondary winding of the transformer. The induced current between the first and second inductors is the output measurement of the sensor.

Over a limited temperature range, the way temperature effects the conductivity of a solution can be modeled linearly using the following formula:

$$\sigma T = \sigma T_{cal}[1 + (\alpha T - T_{cal})]$$

where

T is the temperature of the sample, $T_{cal}$ is the calibration temperature, $\sigma T$ is the electrical conductivity at the temperature T, $\sigma T_{cal}$ is the electrical conductivity at the calibration temperature $T_{cal}$, α is the temperature compensation slope of the solution. The temperature compensation slope for most naturally occurring waters is about 2%/° C., however it can range between 1% and 3%/° C.

After the initial measurements, the water complex is pumped into the water treatment system 10 by circulating pump 18. A divergent pathway is selected for the water complex depending upon the treatment protocol desired. Diverging flow valve 20 directs the water complex flow to either the ionizers 50 or to the particulate precipitators 80, both to be described in more detail below. The entire side-stream particle precipitator water treatment system 10 is controlled by a programmable logic controller, PLC, that coordinates and regulates the water complex flow direction and flow rate through the water treatment system 10.

The PLC also controls the High Voltage power supplies, HV1, HV2, to furnish the appropriate voltage to the electrodes for appropriate treatment of the water complex. HV1 and HV2 control the electricity applied to electrodes within the flow of the water complex moving through the water treatment system 10. A positive dc voltage having a range of between 20 kv and 30 kv acts as a capacitor in the moving water complex that will collapse laminar boundaries in the fluid. The positive high voltage, low wattage charge also will improve thermal transfer across various heat exchanger surfaces. The high voltage power supplies HV1, HV2 will modulate the voltage in response to sensed conductivity in the water complex. A protective circuit creates an alarm condition and automatic shutdown if a high micro-ampere set point is reached. The high voltage, low amperage electrodes impart a net negative charge on dissolved solids contained in the water complex holding them in suspension in the moving flow. Negatively charged piping and conduit internal surfaces repel such negatively charged solids keeping them from lodging at joints and on other surfaces within the thermal exchange fluid flow containment system for maintaining maximum flow rate without internal surface buildup of unwanted particulates. The placement of the high voltage electrodes will be described more fully below.

Figure 2:
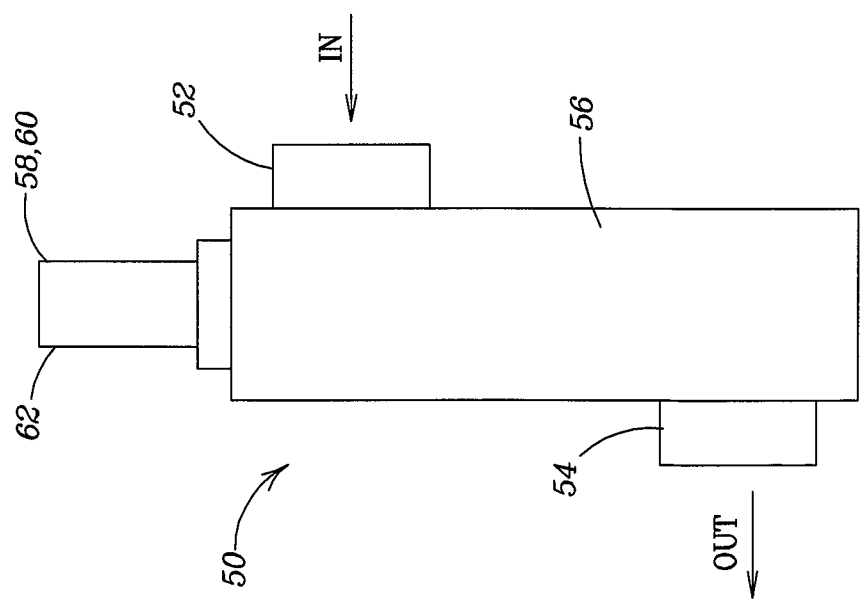
FIG. 2 is a plan view of one of the bio-cell filters of the present invention.

The ionizers 50 consist of a series of containment vessels connected in a series array, each with a different purpose. All of the ionizer vessels 50 are structurally the same and reference can be made to FIG. 2 for showing such structure. The ionizer vessels 50 all have an inlet 52 and an outlet 54. A containment vessel 56 makes up the major component of the ionizer 50. Special electrodes 58, 60 are positioned inside the containment vessel 56 extending through the top using appropriate fittings for fixedly mounting the electrodes 58, 60 to the ionizer 50 without leakage. Each of the ionizers 50 can have a different electrode 58, 60 placed therein and the total number of ionizers 50 can be varied depending upon the total volume of water that is to be filtered with a minimum number of ionizers being at least two such ionizers.

Figure 3:
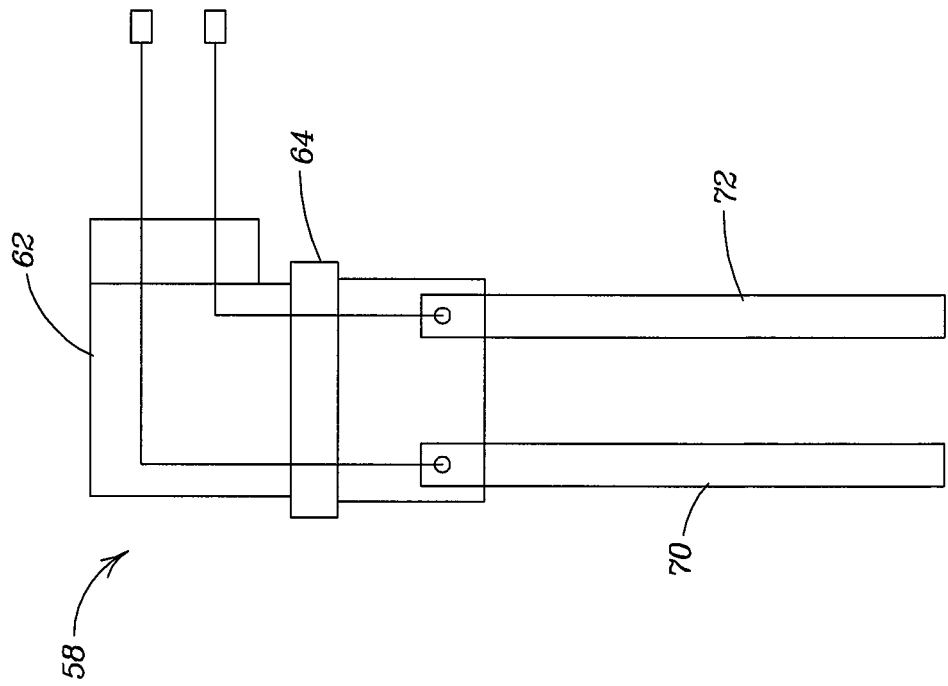
FIG. 3 is a side view of a dual electrode insert into a bio-cell of the present invention.

The first ionizer 50A has an electrode having the structure of electrode 58 shown in FIG. 3. The dual electrode 58 extends into the containment vessel 56 and is held in position by the connector 64 that can be threadedly fitted through the top of the containment vessel 56 or secured in any other manner such that the dual electrodes 70, 72 extend downward into the flow path of the water complex. The electrodes 70, 72 are fixedly positioned on the bottom of the connector 64 with their respective wiring extending upward through the connector 64 and through a cap 62 to be connected to the controlled voltage wiring from a voltage supply for supplying dc voltage in the range of 5-24 Vdc. The voltage and polarity are controlled as to voltage level and timing of voltage supply and polarity reversal by the PLC.

The dual electrodes of electrode 58 are made of titanium that, when charged, drive hydrogen and oxygen from the water complex. The PLC creates a polarity change between the two electrodes of ionizer 50A by using a current reversal effect every 90 seconds. This will reduce the buoyancy of the water complex as the $H_2$ and $O_2$ are driven out of solution. The effect of depriving the water complex of free $H_2$ and $O_2$ will kill most aerobic and anaerobic organisms that are in solution in the water complex creating a solid precipitate for later filtering. Titanium is selected for its lightness of weight and resistance to destruction in the water complex solution. This electrode is powered continually by the PLC for proper treatment of the water complex. Additional ionizers, represented as 50B in FIG. 1, of similar construction may be added between the first and second ionizers, 50A and 50C, in the event that the total volume of the water complex requires additional ionization treatment.

Figures 4, 5:
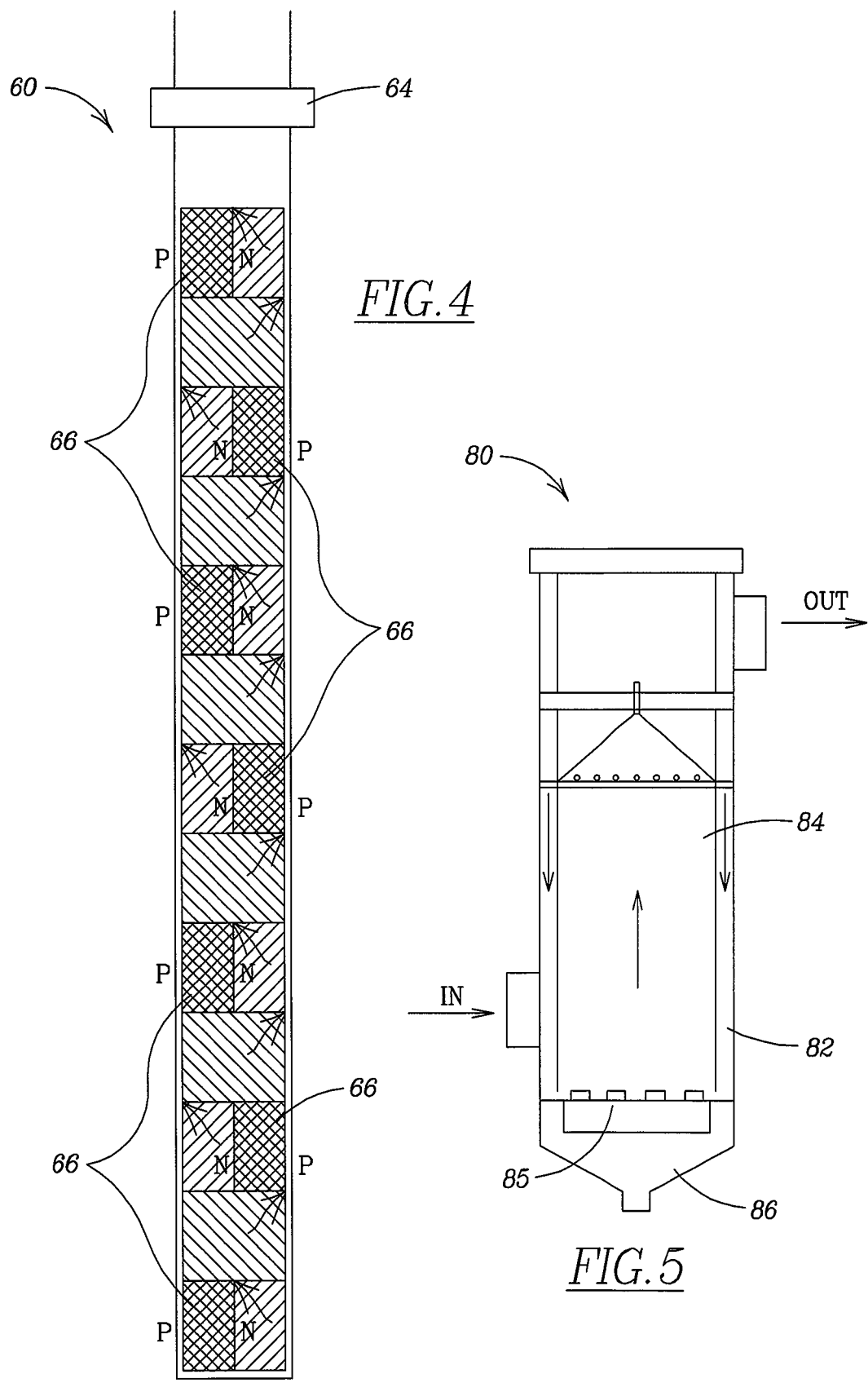
FIG. 4 is a plan view of a magnetic ion electrode insert into a bio-cell of the present invention.
FIG. 5 is a plan view of one of the particulate filters of the present invention.

The second ionizer 50C has a different kind of electrode placed therein that directs its electromagnetic properties against particulate solids. With reference to FIG. 4, the electrode 60 is used to precipitate suspended solids in solution in the water complex of various sizes down to one micron in size. The electrode 60 has a series of high-intensity electro-magnets 66 positioned with reversing polarities along the length of a tube made of polyvinylflouride, a non-conducting polymer. The tube is capped at the bottom and has a similar connector 64 for insertion and fixed connection to the ionizer creating an insulative layer between the water complex and the electro-magnets 66. The positioning of the high-intensity electro-magnets 66 is accomplished by using non-magnetic conductors, e.g., wood, so that the spacing and polarity positioning (indicated by P for positive and N for negative) is maintained along the entire length of the electrode 60. The polarity of each successive electro-magnet 66 is reversed as the stack goes from the bottom to the top of the electrode. The electromagnets 66 impart a surface charge to any clump, coagulate or colloidal particulate matter making particles in the range of 1-5 microns attract other particles to combine together making particles of much larger size. The larger particles can then be mechanically filtered out increasing the thermal conductivity of the water complex.

The third ionizer 50B, as shown in FIG. 1, will also have an electrode of the same structure shown in FIG. 3, if a second electrode of the same type is required for either total treated volume of the water complex, or a different type of electrode is required for precipitation of different dissolved solids. Thus, the ionizer 50B may be of the same type and structure as described for ionizer 50A. It may also contain a different type of electrode materials that may be utilized to achieve a different purpose.

For the different type ionizer 50B, the dual electrodes 70, 72 are made of a copper/silver alloy, where copper makes up 99% and silver makes up 1% of the alloy material. The copper/silver alloy material is utilized to effectively kill and control the regrowth of surface growing algae and slime in cooling tower systems. The copper is discharged into the water complex at a concentration rate of 0.1-0.3 ppm which will remain for approximately one hour in solution in the water complex. During that hour and thereafter the copper will bond with calcium in the water, become a particulate solid and precipitate out of the solution and be removed by the filtering to be described below. The water complex, if necessary, will be dosed with the copper 3-4 times daily where such cycle usually occurs once every four hours during daylight hours. Therefore, the ionizers 50A and 50B are constructed to target living organisms and plant life that will be rendered inert by the ionization and remain in the water complex solution as dissolved solids.

After completing treatment in each of the plurality of at least two ionizers 50 the water complex is presented to a series of mechanical vortex precipitators 80 such as the one shown in FIG. 5. The precipitators 80 are arranged in a parallel array with the fluid inlets at the bottom and the fluid outlets at the top. The inlet for each precipitator 80 enters an outer cylindrical chamber 82 extending the length of the precipitator and having a spacing of in the range of ½ to 1 inch. The water complex is forced downward and into a central cylindrical chamber 54 of an approximate 6 inch diameter creating a vortex having an upward flow toward a perforated inverted cone 83 that will create an extended time for the water complex to flow through the perforations in the inverted cone 83 due to the limited number of perforations. The perforations are arrayed around the periphery of the cone 83 along its inverted edge and are approximately ⅛ inch in diameter. This mechanical arrangement provides a certain retention time and reduced flow of the water complex in the precipitator 80. The increased retention or delay time, in turn, allows the charged particles in the water complex to attract each other, to coagulate or agglomerate, and precipitate downward such that only a limited number of particles are returned to the flowing water complex. The coagulated or agglomerated particulate materials, i.e., dissolved solids that are either organic or inorganic in nature, are heavier and are returned to the vortex and eventually find their way to the sides of the central chamber 84 and precipitate downward along the walls to the bottom of the precipitator 80 and through a series of holes 85 to be collected in a trap 86 for later disposal during a system flush. The mechanical vortex precipitators 80 remove a substantial amount of suspended solids from the water complex and pass the filtered water complex along through the filter outlets to be returned to the cooling system through master outlet valve 14.

Also included, on an as necessary basis, is a bromine feeder 26 that injects a chemical oxidizer to kill all organic material in the water complex. The bromine feeder is isolated by a pair of valves 22, 24 that are opened when the bromine additive becomes necessary, but only as a backup to the several ionizers 50. When required, the bromine feeder becomes active under PLC control only once per day for a 15-20 minute shock chemical treatment. Otherwise, the valves 22, 24 remain closed and the water complex bypasses the bromine feeder 26.

When make-up water is called for, a municipal water inlet is utilized to supply the make-up water. A solid chemical corrosion inhibitor utilizing a preferred non-toxic organic corrosion inhibitor, e.g., organo-phosphate, is dispensed in solid form from a solid chemical feeder 28 and may be added to the fluid flow when required under control of the PLC. The solid chemical inhibitor is isolated by a chemical pump 30 that is operated when the solid chemical additive becomes required to reduce the corrosion level in the pipes and containment vessels of the open-loop cooling system when the make-up water is added to the system.

Figure 6:
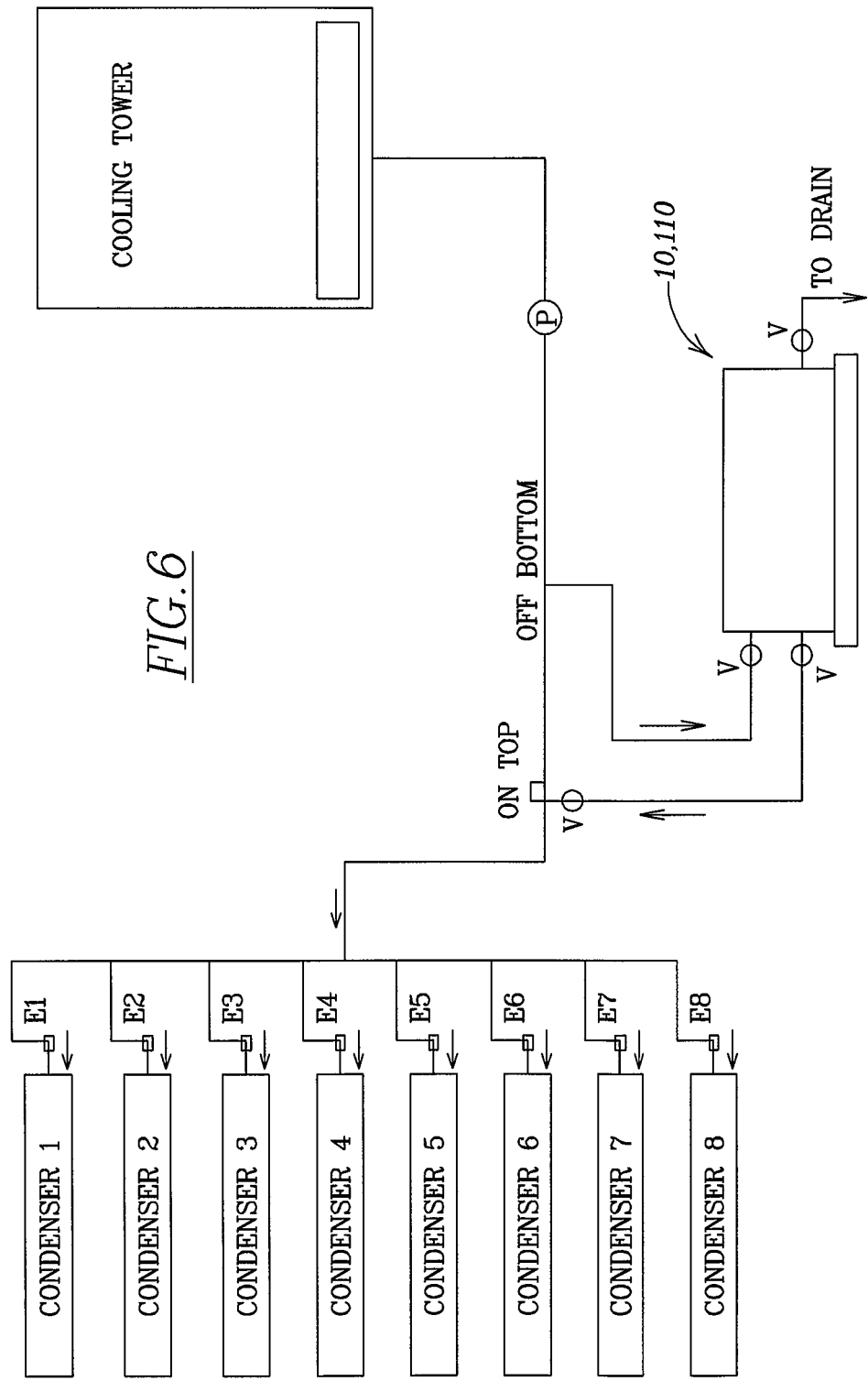
FIG. 6 is a schematic diagram of the various elements and interconnections of the non-chemical water treatment system of the present invention applied to a cooling tower and condenser series of a building air cooling system.

The side-stream particle precipitator water treatment system 10 is shown as an added element of a larger cooling system as depicted in FIG. 6. The inlet water complex to the water treatment system 10 is collected from along the bottom of the conduit carrying the water complex between a cooling tower and a series of condensers utilized for thermal exchange. After being treated, the water complex is added back to the fluid flow between the cooling tower and the condensers by replacing the water complex into the fluid flow along the top of the same conduit. Part of the continuing water treatment is the use of high voltage electrodes E1-E8 that are positioned in each of the condenser 1-8 fluid inlets.

The high voltage, low amperage electrodes, i.e., those shown as E1-E8, are structured as shown in FIG. 7. Each high voltage electrode E1-E8, represented as electrode 90, has a single electrode 92 contained within a tube 94 that has a cap 95 at the bottom and electrically connected at the top of the tube by passing a wire through a connector 96 and a cap 98. The electrode 90, as are each of the electrodes E1-E8, is electrically connected to HV1 or HV2 by the connector 97 and controlled by the PLC.

A view of the electrode 90 centrally axially positioned within the fluid inlet elbow of any of the condensers is shown in FIG. 8A. An alternate flow-path is shown in FIG. 8B in which diverting valves 102, 104 are opened and valve 106 is closed to divert the water complex into a parallel chamber for treatment by the centrally axially positioned high voltage electrode 90. In this way the negatively charged fluid creates a breakdown in the laminar boundary at the inner surfaces of the conduits in contact with the fluid. This, in turn, removes scale, slime, and some corrosion from the conduit surfaces. Without the electrodes 90 creating a negatively charged fluid, the "quiet zone" adjacent the conduit walls would remain statically charged and scale, slime and corrosion would collect reducing thermal exchange and reducing fluid flow necessary for effective cooling and expected thermal exchange for the cooling system.

The purpose of the water treatment system 10, augmented by the several condenser located electrodes 90 (E1-E8), is to save water usage and reduce the energy consumption to effectively operate the cooling system for its intended purposes. The water treatment system 10 effectively increases the efficiency of the cooling system through increased thermal conductivity by the removal of organic materials (organisms and plant life) and reducing particulate materials and dissolved solids within the fluid flow and conduit and containment vessels. This is accomplished by the described electrical charging and mechanical filtering of the water complex described above without the necessity of adding significant amounts of chemicals to the system. The electrical charging of the water complex also has the effect of dispersing the dissolved solids within the water complex to enhance thermal conductivity.

One example of whether the water treatment apparatus of the present invention makes a definitive difference in reducing particulate matter, e.g., suspended solids in the water complex, is the testing of cooling tower water for particle reduction. Testing is accomplished by utilizing an electro-optical particle analyzer to determine whether reduction of suspended particles occurs subsequent to the introduction of the water treatment apparatus. The electro-optical particle analyzer used employed a light scattering principle of operation in a dilute ratio 1:800 with filtered water and particle data correction. Stirring of the water was continuous. The testing was done over a three month period with a baseline analysis and a subsequent three month analysis tabulated in four cooling tower systems by sampling the cooling tower basin water. The following TABLE 1 shows significant reduction in both particulate material and suspended solids.

late materials in cooling systems with only the unique electrical charging of the water complex and the use of electric and electro-magnetic fields to control bio-materials and filter them out of the water complex.

When required based upon the sensor signal from the conductivity meter 17, a flush of the water treatment system 10 is accomplished by diverting the fluid through the diverting valve 20 by reversing fluid flow through the precipitators 80 and opening valve 32 to permit the particulate material precipitated out of the water complex and collected in the precipitators trap 86 to be flushed away along with any particulate material and dissolved solids in the water complex to be flushed through master drain valve 34. A flow meter 36 tracks the flushed fluid to track water usage.

The water treatment system 10 of the present invention requires a lesser quantity of water to create a clean environment in the cooling system conduits and vessels due to the reuse of cleaned water from its ionizer and mechanical vortex precipitating of particulate material and dissolved solids out of the water complex. Since the present water treatment system principally utilizes electrical sources to control dissolved solids within the water complex it, therefore, uses significantly lesser amounts of chemicals. There is a resulting significant decrease in chemical disposal as well as any chemical by-products creating corrosion or build-up

TABLE 1

Particle/Solids Suspended in Water Complex Analysis

| Size (microns) | Site 1 | | Site 2 | | Site 3 | | Site 4 | |
|---|---|---|---|---|---|---|---|---|
| | Baseline Sample | Treatment Sample | Baseline Sample | Treatment Sample | Baseline Sample | Treatment Sample | Baseline Sample | Treatment Sample |
| Particle Counts per 100 ml | | | | | | | | |
| 1-3 | 8,352,320 | 835,508 | 167,046,400 | 633,057 | 40,222,400 | 994,644 | 6,021,040 | 276,928 |
| 3-5 | 1,568,520 | 23,090 | 31,370,400 | 22,860 | 2,073,600 | 220,904 | 2,053,640 | 23,224 |
| 5-10 | 1,708,520 | 48,440 | 34,170,400 | 9,189 | 1,454,000 | 243,224 | 3,079,640 | 36,064 |
| 10-15 | 572,480 | 18,706 | 11,449,600 | 1,642 | 484,000 | 57,648 | 1,151,720 | 16,040 |
| 15-25 | 776,640 | 6,570 | 15,532,800 | 2,612 | 580,800 | 72,788 | 1,456,640 | 31,060 |
| Over 25 | 431,680 | 5,648 | 8,633,600 | 3,635 | 279,200 | 27,708 | 473,600 | 35,092 |
| Solids per 100 Liters of System Volume ($mm^3$) | | | | | | | | |
| 1-5 | 167.20 | 8.16 | 3,344.08 | 6.53 | 454.50 | 22.10 | 179.60 | 3.70 |
| 5-10 | 721.00 | 20.44 | 14,419.91 | 3.88 | 613.60 | 102.64 | 1,299.60 | 15.20 |
| Over 10 | 295,516.85 | 3,839.93 | 5,910,337.07 | 2,456.00 | 191,783.20 | 19,155.80 | 329,153.10 | 23,760.50 |

The significant reduction of particulate and solids material across all four sites having different conduit and vessel arrangements is clearly significant in showing that the water treatment system of the present invention operates to significantly reduce suspended solids.

problems within the cooling system. The use of the electrodes effectively increases the thermal conductivity of the water complex through the breakdown and elimination of organic and inorganic matter and the mechanical filtering removes the particulate materials that have been coagulated

TABLE 2

Comparison of Treated Water Complex for in Suspension Solids

| | Site 1 | | Site 2 | | Site 3 | | Site 4 | |
|---|---|---|---|---|---|---|---|---|
| | Baseline Sample | Treatment Sample | Baseline Sample | Treatment Sample | Baseline Sample | Treatment Sample | Baseline Sample | Treatment Sample |
| ppm | 2964 | 39 | 59281 | 25 | 1929 | 193 | 3306 | 238 |

As one can see from TABLE 2, the significant reduction in suspended solids in parts per million is readily apparent. The operation of the water treatment system of the present invention, without the use of chemicals, significantly reduces the presence of suspended solids and other particutogether by the electro-magnetic electrode of the precipitators through precipitation of the coagulated or agglomerated solids and their collection in the trap. Taken together with the high voltage electrodes positioned in the condenser conduits, the water treatment system reduces corrosion within the conduits and vessel surfaces by breaking down the laminar layers at the conduit and vessel surfaces, as well as by not introducing as great a quantity of chemicals that breakdown and recombine to create corrosive effects on the metal surfaces of the conduits and vessels in the cooling system.

Figure 9:
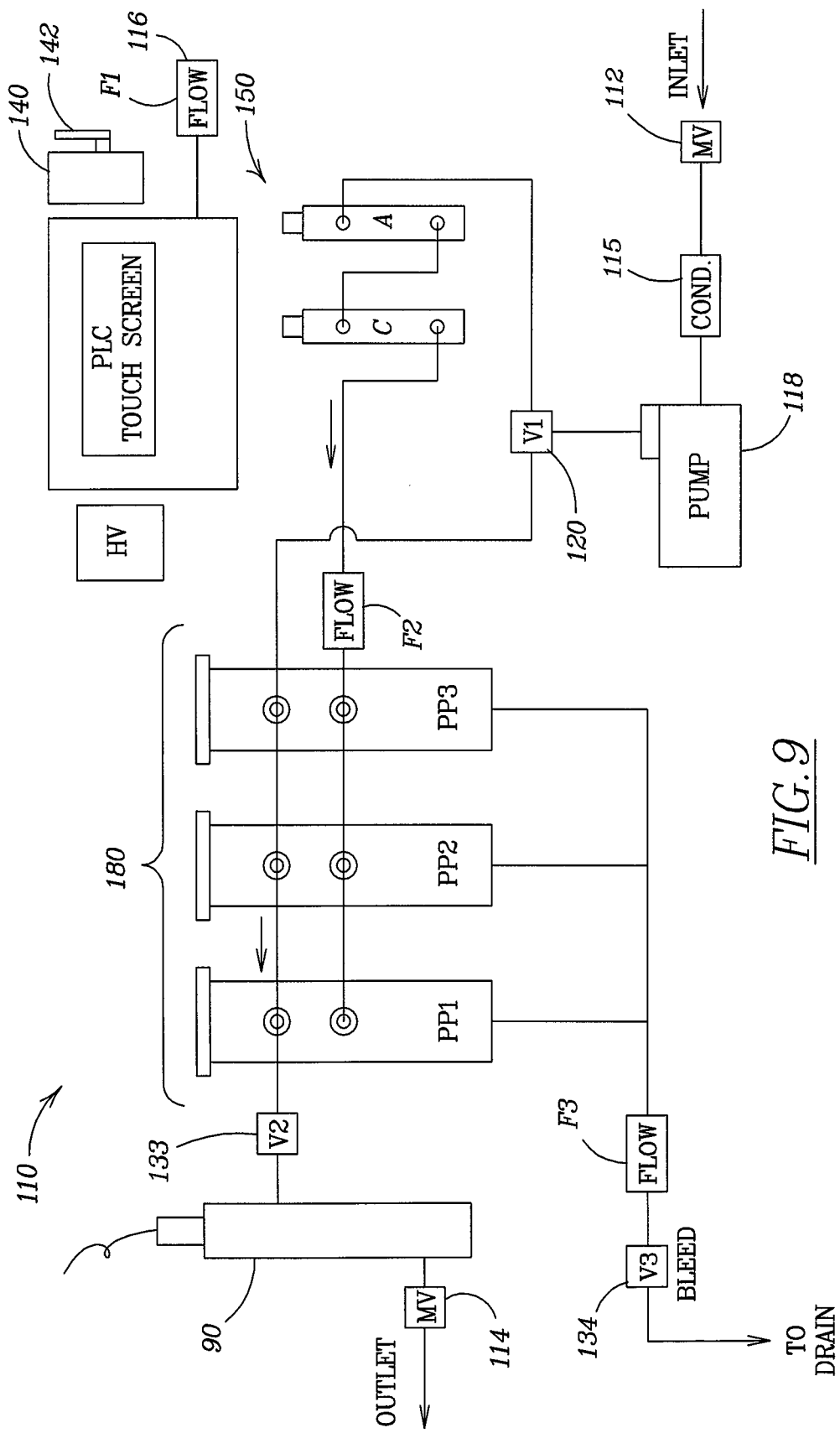
FIG. 9 is a schematic diagram of the various elements and interconnections of a second embodiment of the non-chemical water treatment apparatus of the present invention.
Figure 11:
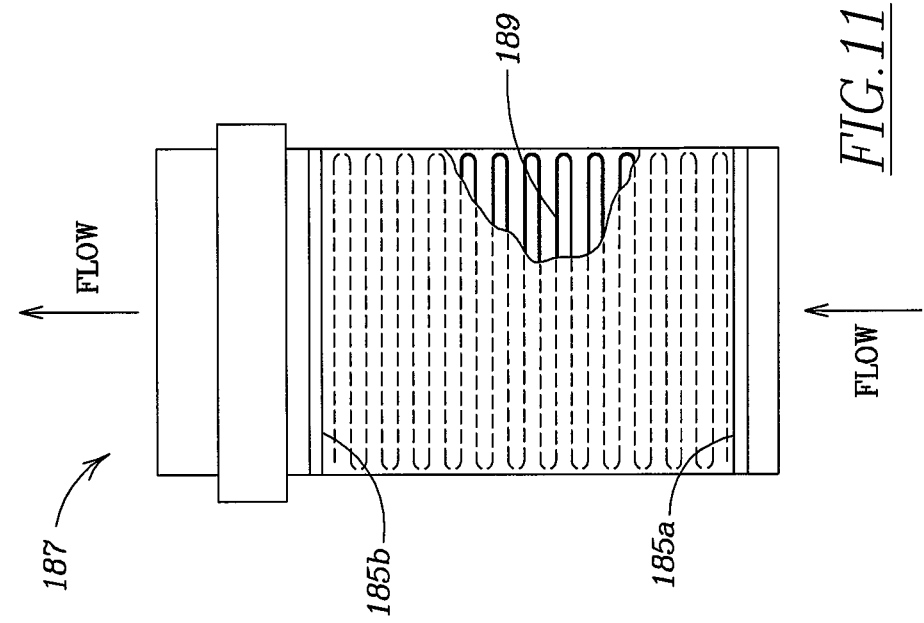
FIG. 11 is a plan view of the static mixer positioned within the particulate filter of FIG. 10.

A second embodiment of the water treatment system 110 of the present invention is shown in FIG. 9. The water treatment system 110 is connected into a water complex heat transfer system by manual inlet valve 112 and manual outlet valve 114. In order to monitor the conductivity of the water passing through the water treatment system 110, a conductivity meter 115 is placed in the inlet water line. The water complex received through the manual inlet valve 112 is pumped into the water treatment system 110 by circulating pump 118. A divergent pathway is selected for the water complex depending upon the treatment protocol desired. Diverging flow valve 120 directs the water complex flow to either the ionizers 150 or to the particulate filters 180, both to be described in more detail below. The entire water treatment system 110 is controlled by a programmable logic controller, PLC, which coordinates and regulates the water complex flow direction and flow rate through the water treatment system 110.

The PLC also controls the High Voltage power supply, HV, to furnish an appropriate voltage level to the electrode 90 for treatment of the water complex. HV controls the electricity applied to the electrode within the flow of the water complex moving through the water treatment system 110. A positive dc voltage having a range of between 20 kv and 30 kv acts as a capacitor in the moving water complex that causes the collapse of laminar boundaries in the fluid. The positive high voltage, low wattage charge also will improve thermal transfer across various heat exchanger surfaces. The high voltage power supply HV will modulate the voltage in response to sensed conductivity in the water complex. A protective circuit creates an alarm condition and automatic shutdown if a high micro-ampere set point is reached. The high voltage, low amperage electrode imparts a net negative charge on dissolved solids contained in the water complex holding them in suspension in the moving flow. Negatively charged piping and conduit internal surfaces repel such negatively charged solids keeping them from lodging at joints and on other surfaces within the thermal exchange fluid flow containment system for maintaining maximum flow rate without internal surface buildup of unwanted particulates. The placement of the high voltage electrode 90 will be described more fully below.

The ionizers 150 consist of a plurality of containment vessels connected in a series array, each with a different purpose. All of the ionizers 150 are structurally the same and reference can be made to FIG. 2 for showing such basic structure. The ionizers 150, similar to ionizers 50, each have an inlet 52 and an outlet 54. A containment vessel 56 makes up the major component of the ionizer 150. Special electrodes 58, 60 are positioned inside the containment vessel 56 extending through the sealed top using appropriate fittings for fixedly mounting the electrodes 58, 60 to the ionizers 150 without leakage. Each of the ionizers 150 has a different electrode 58, 60 placed therein.

The first ionizer 150A has an electrode having the structure of electrode 58 shown in FIG. 3. As described in connection with the first embodiment, the dual electrode 58 extends into the containment vessel 56 and is held in position by the connector 64 that can be threadedly fitted through the top of the containment vessel 56 or secured in any other manner such that the dual electrodes 70, 72 extend downward into the flow path of the water complex. The electrodes 70, 72 are fixedly positioned on the bottom of the connector 64 with their respective wiring extending upward through the connector 64 and through a cap 62 to be connected to the controlled voltage wiring from a voltage supply for supplying dc voltage in range of 5-24 vdc controlled as to voltage level and pulsed timing of voltage supply by the PLC.

The dual electrodes of electrode 58 are made of titanium that, when charged, drive hydrogen and oxygen from the water complex. The PLC creates a polarity change between the two electrodes of electrode 58 of ionizer 150A by using a current reversal effect. This will reduce the buoyancy of the water complex as the $H_2$ and $O_2$ are driven out of solution. The effect of depriving the water complex of free $H_2$ and $O_2$ will kill most aerobic and anaerobic organisms that are in solution in the water complex. Titanium is selected as the material for the electrodes 70, 72 for its lightness of weight and resistance to destruction in the water complex solution. The electrode 58 is continually powered for proper treatment of the water complex.

The second ionizer 150C houses an electrode 60 that directs its magnetic properties against particulate solids. The electrode 60 is used to precipitate suspended solids in solution in the water complex of various sizes down to one micron in size. With reference to FIG. 4 the electrode 60 has a series of high-intensity magnets 66 with reversing polarities arrayed along the interior length of a tube made of polyvinylflouride, a non-conducting polymer. Although previously described as high-intensity electro-magnets 66, high-intensity permanent magnets can be substituted with the same effect. Both magnet types will be referred to by the same identifier 66. The magnet containment tube is capped at the bottom and has a similar connector 64 for insertion and fixed connection to the ionizer 150C creating an insulative layer between the water complex and the magnets 66. The positioning of the high-intensity magnets 66 is accomplished by using non-magnetic conductors, e.g., wood, so that the spacing and polarity positioning (indicated by P for positive and N for negative) is maintained along the entire length of the electrode 60. The polarity of each successive magnet 66 is reversed as the stack goes from the bottom to the top of the electrode. The magnets 66 impart a surface charge to any clump, coagulate or colloidal particulate matter making particles in the range of 1-5 microns attract other particles to combine together making particles of much larger size. The larger particles can then be mechanically filtered out increasing the thermal conductivity of the water complex. Additional ionizers 150 may be added, as required, for larger volumes of a water complex to be treated.

Figure 10:
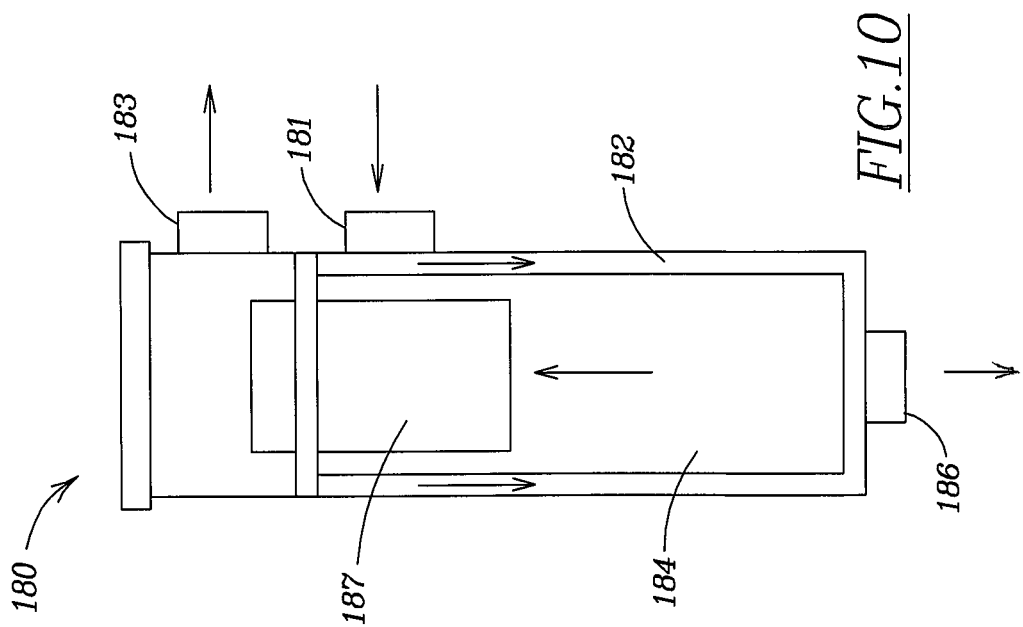
FIG. 10 is a plan view of one of the particulate filters of the second embodiment of the non-chemical water treatment apparatus of the present invention.

After completing treatment in the ionizers 150 the water complex flows to a series of particle precipitate filters 180 such as the ones shown in FIG. 10. The filters 180 are arranged in a parallel array with the fluid inlet 181 at a point lower than the fluid outlet 183 located near the top of the filters 180. With Reference to FIG. 10, the water enters through the inlet 181 for each filter 180 entering an outer cylindrical chamber 182 that forces the fluid down and into a central cylindrical chamber 184 creating a vortex and slowing the flow of the water complex. The central cylindrical chamber 184 has an upward flow toward a static mixer 187 mounted to the topmost portion of the chamber 184 and extending approximately one-half the distance to the bottom of the chamber 184. The slower upward flow of the water complex within the chamber 184 and into the static mixer 187 permits a mostly fluid flow into the static mixer 187 returning particulate materials suspended within the water complex to the vortex in the chamber 184 below. The particulate matter suspended in the vortex eventually finds its way to the sides of the central chamber 184 and precipitates down the walls to the bottom of each filter 180 to be collected in a trap 186 for later disposal during a system flush or purge.

The static mixer 187 includes top and bottom screens 185a, 185b at either end of a vertically oriented open cylinder. The lower screen 185a has small diameter apertures that do not permit passage of large agglomerated particulate material on the order of approximately 200-250 microns. The upper screen 185b has smaller diameter apertures that further restricts the passage of agglomerated particulate material larger than approximately 200-250 microns. Also housed within the static mixer 187 is a stainless steel mesh 189 that is folded over itself across the open cylindrical space within the static mixer 187 occupying the vertical space between the upper and lower screens 185a, 185b. The mesh 189 creates a mixing effect to further slow the flow and reduce turbidity in the water complex by allowing the particulate materials to fall back through the lower screen 185a and be collected in the trap 186 of the filter 180. The particle precipitate filters 180 are utilized to remove the suspended solids already in suspension in the water complex and any additional particulate materials created by the ionization of suspended particles in the water complex by the ionizers 150 by reducing the flow rate of the water complex through the internal structure of the filters 180 and then passing the water complex along through the filter outlets 183 to be returned to the cooling system through manual outlet valve 114. The water complex that is leaving the filters 180 is elevated above the collected solids that were suspended in the water complex so that the returning coolant water does not come into contact with those collected precipitated solids that have settled to the bottom of the filters 180 into the traps 186.

In the second embodiment, the high voltage electrode 90 is positioned in proximity to the particle precipitate filters 180. As in the first embodiment, part of the continuing water treatment is the use of high voltage, low amperage electrodes that are structured as shown in FIG. 7 where the inlet water flow approaches the electrode 90 as shown in FIG. 8A. In the case of the second embodiment, the high voltage electrode 90 has a single electrode 92 contained within a tube 94 that has a cap 95 at the bottom and electrically connected at the top of the tube by passing a wire through a connector 96 and a cap 98. The electrode 90 is electrically connected to HV by the connector 97 and controlled by the PLC in the same manner as described above. The negatively charged water complex creates a breakdown in the laminar boundary at the inner surfaces of any the conduit that comes into contact with the fluid. This, in turn, removes scale, slime, and some corrosion from the conduit surfaces. Without the electrode 90 creating a negatively charged fluid, the "quiet zone" adjacent the conduit walls would remain statically charged and scale, slime and corrosion would collect, or continue to collect, reducing the thermal exchange and reducing fluid flow necessary for effective cooling and expected thermal exchange for the cooling system. After the water complex is further conditioned by the impressing of a negative charge on the water, the flow is returned to the main coolant recycling system.

In the event that the PLC senses that the water conductivity, as detected by the conductivity sensor 115 located on the water inlet line, exceeds a predetermined value, the PLC commands control valve 120 to divert incoming water away from the ionizers 150 and directly to the mechanical precipitators 180, but in a reverse direction, with the water entering through the outlets 183. Substantially simultaneously to PLC also commands valve 134 to open which permits the water to flow through the traps 186 at the bottom of the precipitators 180 carrying the collected precipitated solids out of the water treatment system 110 to a drain. When conductivity of the water complex returns to an accepted predetermined value, valves 120 and 134 are returned to their normal positions by the PLC allowing the water complex to return to its treatment path through the ionizers 150 and precipitate filters 180 exiting through the outlets 183 and proceeding to pass by the electrode 90 to return to the main coolant recycling system. This method of using the incoming water complex to carry away the collected precipitated solids from the precipitator traps 186 saves water versus a complete purge or back flush. Alternatively, a system back flush can occur by closing valve 133, opening valve 134, and diverting the normal water flow through valve 120 directly to the outlets 183 of the precipitators 180 under manual or PLC control. This creates a water flow path downward through the filters 180, out the traps 186 and to the drain carrying away the precipitated solids and cleansing the interiors of the filters 180. When a back flush of the water treatment system is completed, the vales 120, 133 and 134 are returned to their normal states. When make-up water is called for, a municipal water inlet is utilized to supply the make-up water that is added to the coolant system and monitored by the water treatment system by flow meter 116 that provides the flow data directly to the PLC. Additionally, as in the case of the first embodiment, chemical treatment of the water complex can be controlled through the PLC, if required, by introducing a chemical oxidizer and/or corrosion inhibitor into the water complex.

The PLC may be controlled locally, or may be monitored and controlled from a distant location through a wired or wireless communications link. A modem 140 is connected to the PLC such that the control functions can be monitored from other locations either within the building complex for which the cooling system is operating or from a more distant location through connection over the Internet. The modem may have a wired connection, or a wireless connection through an antenna 142. The wireless connection may be an IEEE 802.11x standard Wi-Fi [WLAN] of the A, B, G or N-type, or an rf radio signal for VHF or UHF direct connection to a companion station. Therefore, monitoring and control over the water treatment system 110 may be local or from a distant location.

The water treatment system or side-stream particle precipitator 110 is an added filtering apparatus of a larger cooling system, for example, as depicted in FIG. 6. The inlet water complex to the water treatment system 110 is collected from along the bottom of the conduit carrying the water complex between a cooling tower and a series of condensers utilized for thermal exchange. After being treated, the water complex is added back to the fluid flow between the cooling tower and the condensers by replacing the water complex into the fluid flow along the top of the same conduit.

The purpose of the water treatment system 110, similar to water treatment system 10, is to reduce water usage and energy consumption needed to effectively operate the cooling system for its intended purposes. The water treatment system 110 effectively increases the efficiency of the cooling system through increased thermal conductivity by the removal of organic materials (organisms and plant life) and reducing particulate materials within the fluid flow and conduit and containment vessels by reducing the fluid flow through the particulate filters 180 after the water complex has been appropriated charged to ionize the particulate materials suspended in the water complex so that such materials will attract, agglomerate and be precipitated for collection and disposal. This is accomplished by the described electrical charging and mechanical filtering of the water complex described above without the necessity of adding chemicals to the side-stream particle precipitator or water treatment system 110 of the present invention.

Maintenance of the water treatment systems 10, 110 is also reduced by the longer life of the electrodes in the ionizers 50, 150 that can last for three years or longer without replacement. The high voltage electrodes 90 are used effectively as capacitors rendering them not self-sacrificing of electrode material to the water complex. The electro-magnetic and/or permanent magnetic electrode 60 is encapsulated and is not exposed to any materials that could possibly breakdown magnetic or electrical properties or the composite material of the magnets. Hence, the overall water treatment systems 10, 110 operate more efficiently without the use of harsh, corrosive chemicals, with less energy waste and with fewer overall fluid units needed to achieve the same thermal conductivity for the cooling system as has been previously done with only chemicals uses to eliminate living organisms, particulate materials, and corrosion.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A side-stream particle precipitator water treatment apparatus for the removal of biologic and particulate materials and dissolved solids suspended or retained in a water complex and on the surfaces of containment vessels and conduits for storing and transporting the water complex through a water cooling system comprising:
   a. a pump for circulating the water complex through the water treatment apparatus;
   b. a conductivity meter located at the water inlet to the pump for providing a sensor measurement of the electrical conductivity of the water complex;
   c. a program logic controller to control the timing and voltage supply to the water treatment apparatus, said program logic controller regulates the on/off timing of the circulating pump, the on/off timing, voltage levels and polarity of electrodes contained within ionizer cells, the on/off timing and voltage levels of the cooling system conduit electrodes, and controls the valving for regulating the flow direction and flow rate of the water complex through the ionizer cells and mechanical filters for filtering of particulate matter from the water complex by continual monitoring of the conductivity sensor measurement of the conductivity meter;
   d. a plurality ionizers comprising at least a first and second ionizers sequentially connected with each respective ionizer containing an electrode, wherein said electrodes, when energized, act to substantially eliminate biologic materials in the form of aerobic and anaerobic organisms and particulate solids that are in solution in the water complex;
   e. said first ionizer comprised of a containment vessel that houses a first dual-spaced apart electrode structure extending into the flow path of the water complex within the vessel with each of the dual electrodes being of titanium, wherein, when such dual electrodes are energized under the regulation of the programmable logic controller with either the same or reverse polarity dc voltage, the dual electrodes drive free $H_2$ and $O_2$ from the water complex depriving the water complex of those chemicals resulting in the substantial elimination of most aerobic and anaerobic organisms that are in solution in the water complex for the lack of said chemicals;
   f. said second ionizer being comprised of a containment vessel that houses a single electrode structure extending into the flow path of the water complex within said vessel with said electrode consisting of a plurality of high-intensity permanent magnets positioned with spacing and polarity positioning maintained along the entire length of the electrode within a non-conducting outer tube, wherein said permanent magnets impart a surface charge to any clump, coagulate or colloidal particulate matter making particles in the range of 1-5 microns attract other particles to combine together making particles of larger sizes that will precipitate out of solution and be removed by mechanical filtering of the particulate solids from the water complex;
   g. a plurality of mechanical vortex precipitators connected in series to mechanically precipitate said particles of larger size out of the water complex for disposal, each of said plurality of mechanical vortex precipitators being comprised of a containment vessel having an inlet permitting the water complex to flow into and downward through an outer cylindrical chamber surrounding a central cylindrical chamber housing a static mixer located in an upper portion thereof and a trap at the bottom of the central cylindrical chamber with an outlet located above the central cylindrical chamber and the static mixer for the water complex outflow, wherein each of said mechanical precipitators forces the entering water complex downward through the outer cylindrical chamber and into the central cylindrical chamber creating a vortex having an upward flow toward the static mixer, said static mixer causing a delay in the outward flow of the water complex through the outlet, said water complex and the suspended and dissolved solids contained therein are retained within the static mixer for a limited time causing the return of the suspended particulate materials to the vortex below in the central cylindrical chamber which forces the suspended particulate materials outward to the sides of the central cylindrical chamber to precipitate down along the chamber walls to the bottom of the central cylindrical chamber and through a plurality of holes to be collected in the trap below for disposal;
   h. a high voltage low wattage electrodes situated within one or more conduits in the water cooling system to negatively charge the water complex creating a breakdown in the laminar boundary along the inner surfaces of the conduits in contact with the water complex that will dislodge and remove scale, slime, and some corrosion from the conduit surfaces and to disperse any retained dissolved solids within the water complex; whereby the water complex is cleansed of biologic and particulate matter either in suspension or residing on conduit or containment vessel surfaces increasing the thermal conductivity of the water complex and reducing overall water usage.

2. The water treatment apparatus of claim 1, wherein the dual electrodes housed in the first ionizer are continually energized with varying voltage levels within the range of 5-24 volts dc.

3. The water treatment apparatus of claim 1, wherein the plurality of permanent magnets of the electrode housed in the second ionizer are spatially separated by a non-conducting spacer and aligned between the plurality of separating non-conducting spacers back-to-back, each permanent magnet being of the opposite polarity to its adjacent permanent magnets.

4. The water treatment apparatus of claim 1, further comprising one or more additional ionizers positioned between the first and second ionizers for treatment of higher volumes of the water complex, each said additional ionizers housing a dual-spaced apart electrode structure extending into the flow path of the water complex with each electrode made of titanium, wherein, when such dual electrodes are energized under the regulation of the programmable logic controller with either the same or reverse polarity dc voltage, the dual electrodes drive free $H_2$ and $O_2$ from the water complex depriving the water complex of those chemicals resulting in the substantial elimination of most aerobic and anaerobic organisms that are in solution in the water complex for the lack of said chemicals.

5. The water treatment apparatus of claim 4, wherein the dual electrodes housed in the one or more additional ionizers are continually energized with varying voltage levels within the range of 5-24 volts dc.

6. The water treatment apparatus of claim 1, further comprising a high voltage electrode centrally axially positioned within one conduit of the water cooling system for negatively charging the water complex, wherein said high voltage electrode, when energized under the regulation of the programmable logic controller, causes the water complex to become negatively charged creating a breakdown in the laminar boundary at the inner surfaces of the conduits in contact with the water complex which, in turn, removes scale, slime, and corrosion from the conduit surfaces and dispersing the dissolved solids contained within the water complex increasing effective cooling and expected thermal exchange for the water cooling system.

7. The water treatment apparatus of claim 1 further comprising a water complex flush which will occur under the regulation of the programmable logic controller, upon the sensing by the conductivity meter of an increased electrical conductivity in the water complex, by altering the flow direction and flow rate of the water complex through the mechanical precipitators by diverting the water complex through a diverting valve and entering through an upper portion of the mechanical vortex precipitators reversing the normal flow permitting the particulate material precipitated out of the water complex and collected in a trap in each of the mechanical precipitators to be flushed away along with any dissolved solids and particulate matter retained or suspended in the water complex through a drain valve.

8. The water treatment apparatus of claim 1 further comprising a programmable logic controller that is capable of being controlled and monitored from a location remote from the water treatment system through a wired or wireless communications link.

* * * * *